US010211980B1

United States Patent
Lindell

(10) Patent No.: US 10,211,980 B1
(45) Date of Patent: Feb. 19, 2019

(54) METHOD FOR LATTICE-BASED DECRYPTION OF DATA

(71) Applicant: Bar Ilan University, Ramat Gan (IL)

(72) Inventor: Yehuda Lindell, Givat Shmuel (IL)

(73) Assignee: Bar Ilan University (IL)

( * ) Notice: Subject to any disclaimer, the term of this patent is extended or adjusted under 35 U.S.C. 154(b) by 0 days.

(21) Appl. No.: 15/938,500

(22) Filed: Mar. 28, 2018

(51) Int. Cl.
  *H04L 9/32* (2006.01)
  *H04L 9/08* (2006.01)
  *H04L 9/30* (2006.01)
  *G06N 99/00* (2010.01)

(52) U.S. Cl.
  CPC ............ *H04L 9/085* (2013.01); *H04L 9/0825* (2013.01); *H04L 9/0852* (2013.01); *H04L 9/3093* (2013.01); *G06N 99/002* (2013.01)

(58) Field of Classification Search
  CPC . H04L 9/3093; H04L 9/0825; H04L 63/0435; H04L 9/085; H04L 9/0852; G06N 99/002
  See application file for complete search history.

(56) References Cited

U.S. PATENT DOCUMENTS

| 2012/0221867 A1* | 8/2012 | Botzum | G06F 12/1408 713/193 |
| 2014/0195809 A1* | 7/2014 | Solow | H04L 9/085 713/171 |

OTHER PUBLICATIONS

Bendlin et al., Threshold Decryption and Zero-Knowledged Proofs for Lattice-Based Cryptosystems, 2010. (Year: 2010).*

* cited by examiner

*Primary Examiner* — Trong H Nguyen
(74) *Attorney, Agent, or Firm* — Gearhart Law, LLC

(57) ABSTRACT

The subject matter discloses a method for decrypting ciphertext, comprising obtaining multiple shares of a vector representing a secret key in multiple computerized entities, receiving a request to decrypt a ciphertext from an application server, each entity of the multiple computerized entities computes a linear function, the linear function receives as input a share of the vector stored in each entity of the multiple computerized entities and a ciphertext accessible to the entity, performing a plaintext multi-party computation (MPC) process by the multiple computerized entities using the output of the computation performed by each entity independently, computing an output of the linear function receiving the secret key and the ciphertext as input, wherein none of the multiple computerized entities have access to the share stored in another computerized entity.

11 Claims, 3 Drawing Sheets

METHOD FOR LATTICE-BASED DECRYPTION OF DATA

FIELD OF THE INVENTION

The present invention is generally related to data decryption, more specifically to data decryption using lattice-based methods.

BACKGROUND OF THE INVENTION

The question of whether or not a large-scale quantum computer will be built is a concern to the security world. This is due to the fact that large-scale quantum computers, if built, will be able to break the standard asymmetric cryptographic schemes in wide use today—namely, RSA and discrete log (over finite fields and Elliptic curves). As such, the cryptography world is preparing for this possible eventuality (e.g., NIST is now running a process to standardize post-quantum secure algorithms).

One of the leading techniques for achieving post-quantum secure asymmetric encryption is lattice-based cryptography. A lattice is a type of group (loosely speaking, a group is a mathematical object that supports an operation between objects and closure). A lattice is defined by a series of base vectors B={b1, . . . , bn}, and the lattice itself is all of the integer linear combinations of these vectors. Lattices come with some problems that are thought to be very hard (i.e., cannot be solved efficiently), for example given a basis B find the shortest (or close to shortest) vector in the lattice, or given a basis B and a vector v find a vector that is close to v. Lattice-based cryptography has the property that if the underlying problem is indeed hard, the cryptographic scheme is provably secure. Importantly, these problems are thought to be hard even for quantum computers. Thus, lattice-based cryptography is a good candidate for post-quantum asymmetric cryptography. There are a number of encryption algorithms that are based on lattices, and are assumed to be post-quantum secure. Some examples are the GGH encryption scheme, NTRUencrypt, and LIMA.

SUMMARY OF THE INVENTION

The subject matter discloses a computerized system and method used in regular computers in the "post-quantum era", after quantum computers of sufficient scale have been built. The invention considers an asymmetric encryption scheme that even quantum computers cannot break. The methods disclose decrypting such schemes using shared keys via MPC.

It is an object of the claimed subject matter to disclose a method for decrypting ciphertext, comprising obtaining multiple shares of a vector representing a secret key in multiple computerized entities, receiving a request to decrypt a ciphertext from an application server, each entity of the multiple computerized entities computes a linear function, the linear function receives as input a share of the vector stored in each entity of the multiple computerized entities and a ciphertext accessible to the entity, performing a plaintext multi-party computation (MPC) process by the multiple computerized entities using the output of the computation performed by each entity independently, computing an output of the linear function receiving the secret key and the ciphertext as input, wherein none of the multiple computerized entities have access to the share stored in another computerized entity.

In some cases, the method further comprises performing a distribution multi-party computation (MPC) process to distribute shares of a vector representing a secret key in the multiple computerized entities.

In some cases, the method further comprises outputting the plaintext from the linear function receiving the secret key and the ciphertext as input.

In some cases, the method further comprises performing a computerized verification process configured to verify that all the multiple computerized entities correctly computed their function.

In some cases, performing a correctness verification MPC process by the multiple computerized entities using the output of the computation performed by each entity of the multiple computerized entities only upon receiving a confirmation that all multiple computerized entities correctly computed their function.

In some cases, the computerized verification process further comprises multiple subsets of the multiple computerized entities obtaining multiple mathematically associated shares of a secret, none of the entities have access to the share stored in another entity, each of the multiple subset of the multiple computerized entities computes the linear function using the shares associated with the subset, performing a correctness verification MPC process between all the multiple computerized entities using the output of the linear function computed by each of the subsets of the multiple computerized entities. If all the results of the linear combination provided by all the entities are equal, sending an indication to perform the plaintext MPC process and output the plaintext.

In some cases, the mathematically associated shares are additive shares of the secret. In some cases, the mathematically associated shares are based on Shamir shares based on polynomials. In some cases, the secret is the secret key vector s.

In some cases, the method further comprises performing a computerized ciphertext verification process configured to verify that the ciphertext that was decrypted matched a predefined form. In some cases, computerized ciphertext verification process comprises a multi-party computation process performed by the multiple entities. In some cases, the method further comprises sending the plaintext to a device that requested the plaintext.

It is another object of the claimed subject matter to disclose a system for decrypting ciphertext, comprising multiple computerized entities having communication modules, storage units and processing units, said multiple computerized entities are configured to store multiple shares of a vector representing a secret key, receive a request to decrypt a ciphertext from an application server, each entity of the multiple computerized entities computes a linear function—the linear function receives as input a share of the vector stored in each entity and a ciphertext accessible to the entity, perform a plaintext MPC process by the entities using the output of the computation performed by each entity independently, compute an output of the linear function receiving the secret key and the ciphertext as input, wherein none of the multiple entities have access to the share stored in another entity.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention discloses a method for decrypting ciphertext using multi-party computation (MPC) processes. The method uses some principles from Lattice-based decryption. The method utilizes multiple distinct multi-party computation (MPC) processes—one for splitting a share to be stored in multiple computerized entities that perform at least a portion of the methods disclosed below. A second MPC process is configured to receive values from the multiple computerized entities and output a value of a function as elaborated below. A third MPC process is configured to determine whether or not all the entities computed a function locally in a correct manner. A fourth MPC process may be used to verify that the ciphertext that was decrypted was of a predefined form.

Figure 1:
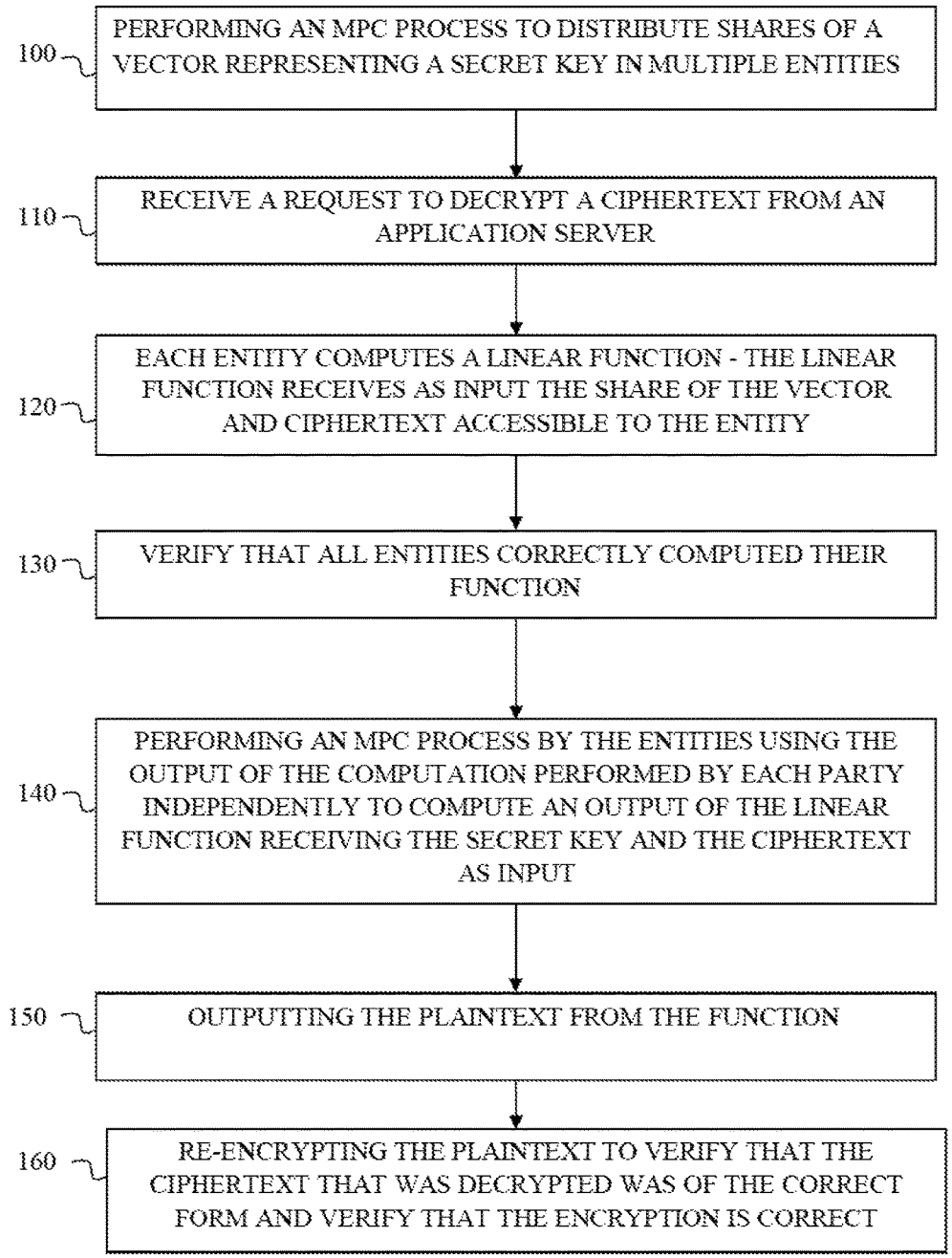
FIG. 1 shows a method for decrypting ciphertext using multi-party computation (MPC), according to exemplary embodiments of the present invention.

FIG. 1 shows a method for decrypting ciphertext using multi-party computation (MPC), according to exemplary embodiments of the present invention. Step 100 discloses performing a distribution MPC process configured to distribute shares of a vector representing a secret key in multiple entities. The shares may be stored in memory modules of each of the entities. The entities may be servers, personal computers, web servers, tablet computers, cellular phones, or any electronic device having a memory, processing module and communication, which enables the multiple computerized entities to exchange information between them when performing the MPC processes. In some exemplary embodiment, the shares may be additive shares, such that the accumulated sum of all the shares may be the secret key. In some exemplary embodiments, the shares may satisfy a mathematical computation that enables reconstructing secret key from the output of computations performed locally on each of the multiple computerized entities.

Step 110 discloses receiving a request to decrypt a ciphertext from an application server. Such application server may be any server to which a user or a device requests access, or access to the data inside the application server. In case the data in the application server is encrypted, a request is sent to decrypt the data in order to enable access to the user or device.

Step 120 discloses each entity computes a linear function—the linear function receives as input the share of the vector and ciphertext accessible to the entity. Each of the multiple entities comprises a communication module configured to receive a command to compute the linear function. The specific linear function depends on the specific encryption scheme being used. The function may be the computation $s \cdot c + s \cdot d$ (where (c,d) constitute the ciphertext, represented as two vectors, s is the secret key vector, and addition/multiplication is component-wise). The function may also include Fast Fourier Transform or inverse Fast Fourier Transform inverse operations on the vector after the component-wise multiplication and addition. In general, it can be whatever linear function is required for the decryption of the specified scheme (which is typical for lattice based encryption schemes). The linear function computed by each entity may be the same function or different functions used by different entities. The ciphertext, or link to an URL address storing the ciphertext, may be stored in a memory unit of each entity, or sent with the request to compute the function. In some exemplary embodiments, the entire output of the function is not revealed between the entities along the entire process, and each of the multiple entities only has the output it computed.

Step 130 discloses verifying that all entities correctly computed their linear function correctly. The verification may be performed using a correctness verification MPC process as elaborated in FIG. 2. In some other cases, a central entity communicates with the multiple entities and uses mathematical computations implemented by software, firmware or hardware to verify that all the entities outputted the same value of the linear function computed in step 120.

Step 140 discloses performing a plaintext MPC process to compute the plaintext. The plaintext MPC process is executed between the multiple entities, without revealing the secret share stored in each entity. The input of the plaintext MPC process is the output of the linear function computed locally in each of the entities and the ciphertext. For example, entity P1 can compute $m1 = s1 \cdot c + s1 \cdot d$ and entity P2 can compute $m2 = s2 \cdot c + s2 \cdot d$, as s1 and s2 are shares of the secret. The result of $m1 + m2$ equals $s \cdot c + s \cdot d$. In some exemplary embodiments, the plaintext MPC computation adds the two vectors representing the ciphertext, carries out the local transformation to each element, and outputs the final result, which is the plaintext.

In some other exemplary embodiments, the ciphertext is represented by a single vector C and a linear combination may be $s \cdot c$, or $d - s \cdot c$ with ciphertext (c,d). Other representations of linear functions are also included in the scope of the subject matter, as linearity is defined when $P(a) + P(b) = P(a+b)$. The present invention enables complex computations, for example Fourier transforms, which are computed locally in each of the multiple entities, and the MPC only carries addition of the results of the Fourier transforms provided by each of the entity.

Step 150 discloses outputting the plaintext from the function. The method may also comprise a step of sending the plaintext to a device that requested it, for example a user's personal device such as 320 of FIG. 3.

Step 160 discloses re-encrypting the plaintext to verify that the ciphertext that was decrypted was of the correct form and verify that the encryption is correct. In some exemplary embodiments, the re-encryption comprises an MPC process between the entities.

Figure 2:
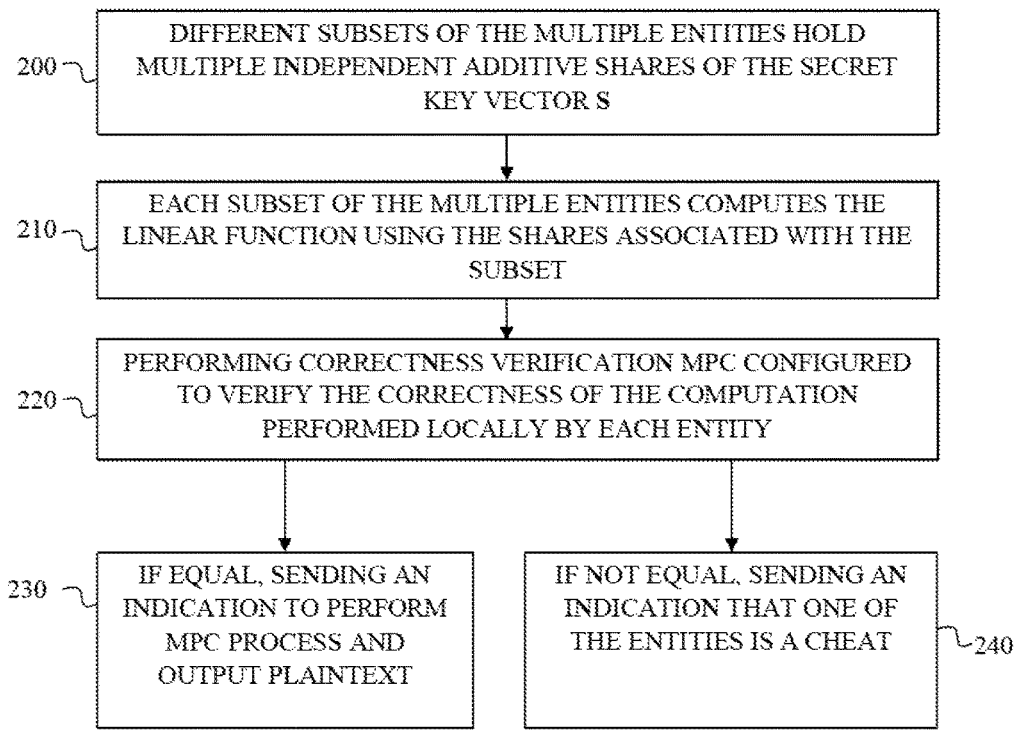
FIG. 2 shows a method for verifying correctness of a computation performed locally by each of the multiple computerized entities, according to exemplary embodiments of the present invention; and, FIG. 3 shows a computerized environment configured to implement the method for decrypting ciphertext using multi-party computation (MPC), according to exemplary embodiments of the present invention.

FIG. 2 shows a method for verifying correctness of a computation performed locally by each of the multiple computerized entities, according to exemplary embodiments of the present invention. Verifying the correctness is configured to prevent a case in which one of the entities provides an incorrect result to the post-processing MPC that performs the transformation of the ciphertext into the plaintext.

Step 200 discloses different subsets of multiple entities holds multiple independent linear shares of the secret key vector s. The linear shares may be additive shares of the secret. Each of the entities holds independent shares of the same secret. For example, entities P1 and P2 hold s1 and s2 such that s1+s2=s, entities P1 and P3 hold t1 and t3 such that t1+t3=s, and entities P2 and P3 hold u2 and u3 such that u2+u3=s. It should be noted that all sums equal the same s.

Step 210 discloses each subset of the multiple entities computes the linear function using the shares associated with the subset. For example, subset of entities P1 and P2 input the shares s1 and s2 into the linear function. P1 uses t1 when computing the linear combination with P3 and uses s1 when computing the linear combination with P2. The output of the linear function may be stored in one of the entities included in the subset associated with the specific result.

Step 220 discloses performing a correctness verification MPC configured to verify the correctness of the computation performed locally by each entity. The correctness verification MPC receives as input the output of the linear functions associated with each subset, as computed in step 210. The correctness verification MPC comprises comparing all the results provided by all the subsets and verifies that all the results are equal.

Step 230 is performed in case all the outputs of the different subsets have an equal value inputted into the correctness verification MPC. In such a case, the output of the correctness verification MPC is sending an indication to perform MPC process and output the plaintext.

Step 240 is performed in case not all the entities provide an equal value into the correctness verification MPC. In such a case, the output of the correctness verification MPC is sending an indication that at least one of the entities is a cheat.

Figure 3:

FIG. 3 shows a computerized environment configured to implement the method for decrypting ciphertext using multi-party computation (MPC), according to exemplary embodiments of the present invention. The ciphertext to be decrypted is stored on an application server 330. Such application server 330 may be a web server configured to store information, or a server configured to enable insertion of data or commands therein. Access to the data can be done only after decrypting information, for example captcha requiring decryption of an image, or decryption of information in order to enable access to a user interface in which a person or device can input a command. The ciphertext is encrypted using a secret key. The environment comprises multiple security servers 310 and 315 configured to store shares of the secret key used to encrypt the information stored in the application server 330. The shares of the secret key may be divided using a multi-party computation (MPC) process, after which the secret key is not accessible to any entity, and none of the security servers 310 and 315 have access to any of the shares stored in the other servers. In some exemplary cases, the process of the present invention may be carried out my two or more security servers. In some exemplary cases, an auxiliary server may be used to perform the correctness verification MPC process disclosed above, for example in case a number of even servers is used to compute a linear function. In some cases, all the servers compute an identical linear function. Each of the multiple security servers 310 and 315 has a memory, processing module and communication module, and are capable to cooperate when performing various distinct MPC processes between them. The multiple security servers 310 and 315 comprise a processor configured to computes a linear function and the communication module transmits a manipulation on the output of the computation to the other entities when executing the plaintext multi-party computation (MPC) process.

In some exemplary cases, the process of decrypting the ciphertext begins with a request to access the plaintext stored in the application server 330. Such request may be sent from a user operating a personal user's device 320, such as phone, laptop, tablet computer and the like, for example a user requesting to access encrypted financial information stored on a bank database represented by application server 330. The request may also be sent or initiated from a server wishing to access amend or add information stored on the application server 330. The request for information or access is first sent to the application server 330. Then, the application server 330 sends a request to decrypt the information. In some cases, the request comprises a query of whether or not the entity that asked for the data stored in the application server 330 is entitled to access the data. The request from the application server is sent to the multiple security servers 310 and 315, each stores a share of the secret key used to encrypt the information stored in the application server 330. Communication between the application server 330 and the multiple security servers 310 and 315 may be done via the internet, via WAN, LAN or any other technique desired by the person skilled in the art.

The multiple security servers 310 and 315 compute the linear function that receives as input a share of the vector stored in the entity and a ciphertext accessible to each entity. Then, the multiple security servers 310 and 315 perform a plaintext multi-party computation (MPC) process using the output of the computation performed by each entity independently and compute an output of the linear function receiving the secret key and the ciphertext as input. The output, which is the plaintext, is sent by at least one of the multiple security servers to the device which asked for the decrypted information from the application server 330. For example, security server 310 sends the plaintext to the user's device 320.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:
1. A method for decrypting ciphertext, comprising:
  obtaining multiple shares of a vector representing a secret key in multiple computerized entities;
  receiving a request to decrypt the ciphertext from an application server;
  computing a linear function by each entity of the multiple computerized entities to obtain an output, the linear function receives as input a share of the vector stored in each entity of the multiple computerized entities and the ciphertext accessible to each entity of the multiple computerized entities;
  performing a plaintext multi-party computation (MPC) process by the multiple computerized entities using the output of the computation of the linear function performed by each entity of the multiple computerized entities independently;
  computing an output of the linear function receiving the secret key and the ciphertext as inputs;

performing a computerized verification process configured to verify that all the multiple computerized entities correctly computed their linear function and their plaintext MPC process; and performing a correctness verification MPC process by the multiple computerized entities using the output of the computation of the linear function performed by each entity of the multiple computerized entities only upon receiving a confirmation that all the multiple computerized entities correctly computed their linear function, wherein none of the multiple computerized entities have access to the share of the vector stored in another computerized entity.

2. The method of claim 1, further comprises performing a distribution multi-party computation (MPC) process to distribute shares of a vector representing a secret key in the multiple computerized entities.

3. The method of claim 1, further comprises outputting a plaintext from the linear function receiving the secret key and the ciphertext as input.

4. The method of claim 1, wherein the computerized verification process further comprises:

obtaining by multiple subsets of the multiple computerized entities multiple mathematically associated shares of a secret, none of the multiple computerized entities have access to the share stored in another entity;

each of the multiple subsets of the multiple computerized entities computes the linear function using the shares associated with the multiple subsets of the multiple computerized entities;

performing a correctness verification MPC process between all the multiple computerized entities using the output of the linear function computed by each of the multiple subsets of the multiple computerized entities;

responsive to determining all results of a linear combination provided by all the multiple computerized entities are equal, sending an indication to perform the plaintext MPC process and output a plaintext.

5. The method of claim 4, wherein the mathematically associated shares are additive shares of the secret.

6. The method of claim 4, wherein the mathematically associated shares are based on Shamir shares based on polynomials.

7. The method of claim 4, wherein the secret is the secret key vector s.

8. The method of claim 1, further comprises performing a computerized ciphertext verification process configured to verify that the ciphertext that was decrypted matched a predefined form.

9. The method of claim 8, wherein the computerized ciphertext verification process comprises a multi-party computation process performed by the multiple computerized entities.

10. The method of claim 1, further comprises sending a plaintext to a device that requested the plaintext.

11. A system for decrypting ciphertext, comprising multiple computerized entities having communication modules, memories and processing units, said multiple computerized entities are configured to:

store multiple shares of a vector representing a secret key;

receive a request to decrypt the ciphertext from an application server, wherein each entity of the multiple computerized entities computes a linear function to obtain an output, and wherein the linear function receives as input a share of the vector stored in each entity of the multiple computerized entities and the ciphertext accessible to each entity of the multiple computerized entities;

perform a plaintext multi-party computation (MPC) process by the multiple computerized entities using the output of the computation of the linear function performed by each entity of the multiple computerized entities independently;

compute an output of the linear function receiving the secret key and the ciphertext as inputs; and perform a computerized verification process configured to verify that all the multiple computerized entities correctly computed their linear function and their plaintext MPC process; and perform a correctness verification MPC process by the multiple computerized entities using the output of the computation of the linear function performed by each entity of the multiple computerized entities only upon receiving a confirmation that all the multiple computerized entities correctly computed their linear function, wherein none of the multiple computerized entities have access to the share of the vector stored in another entity.

* * * * *